(12) United States Patent
Wang et al.

(10) Patent No.: US 10,541,846 B2
(45) Date of Patent: Jan. 21, 2020

(54) METHOD AND SYSTEM FOR MULTI-CARRIER TIME DIVISION MULTIPLEXING MODULATION/DEMODULATION

(71) Applicant: CHONGQING UNIVERSITY OF POSTS AND TELECOMMUNICATIONS, Chongqing (CN)

(72) Inventors: Guangyu Wang, Munich (DE); Qianbin Chen, Chongqing (CN); Kai Shao, Chongqing (CN); Ling Zhuang, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 14 days.

(21) Appl. No.: 15/563,574

(22) PCT Filed: Mar. 31, 2015

(86) PCT No.: PCT/CN2015/075557
§ 371 (c)(1),
(2) Date: Sep. 30, 2017

(87) PCT Pub. No.: WO2016/154911
PCT Pub. Date: Oct. 6, 2016

(65) Prior Publication Data
US 2018/0091343 A1    Mar. 29, 2018

(51) Int. Cl.
*H04L 27/26*    (2006.01)
*H04L 5/00*    (2006.01)
*H04L 25/03*    (2006.01)

(52) U.S. Cl.
CPC .......... *H04L 27/263* (2013.01); *H04L 5/0007* (2013.01); *H04L 25/03006* (2013.01);
(Continued)

(58) Field of Classification Search
None
See application file for complete search history.

(56) References Cited

U.S. PATENT DOCUMENTS 6,658,441 B1 * 12/2003 Kim .................. G06F 17/142
708/404
7,443,917 B2    10/2008 Vitenberg
(Continued)

FOREIGN PATENT DOCUMENTS

| CN | 102355273 A | 2/2012 |
|----|-------------|--------|
| CN | 103326972 A | 9/2013 |
| CN | 103441734 A | 12/2013 |

OTHER PUBLICATIONS

International search report in International Application No. PCT/CN2015/075557 dated Jan. 4, 2016, 2 pages.

*Primary Examiner* — Angel T Brockman
(74) *Attorney, Agent, or Firm* — Metis IP LLC

(57) ABSTRACT

The present disclosure provides a multi-carrier time-division multiplexing (MC-TDMA) modulation and demodulation method and system. Before multi-carrier modulation is performed on an input symbol, an interleaving allocation and an FFT may be performed, a time domain symbol may be transformed into a frequency domain symbol signal to perform a MDFT treatment. A sending end may adopt an analyzing filter bank structure, and pre-filtering and an IFFT may be performed on a signal successively. A pre-filter may be positioned between an NM point FFT and an M point IFFT, a PAPR value of the system may be reduced using the symmetry of a coefficient of a filter, and a frequency domain (Continued)

symbol signal may be allocated to different sub-bands for multi-carrier modulation.

15 Claims, 5 Drawing Sheets

(52) U.S. Cl.
CPC .... *H04L 27/265* (2013.01); *H04L 2025/0342* (2013.01); *H04L 2025/03401* (2013.01); *H04L 2025/03414* (2013.01)

(56) References Cited

U.S. PATENT DOCUMENTS

| | | | | |
|---|---|---|---|---|
| 2004/0013084 | A1* | 1/2004 | Thomas | H04L 25/03006 370/210 |
| 2006/0039273 | A1* | 2/2006 | Gore | H04L 5/0044 370/208 |
| 2011/0164490 | A1* | 7/2011 | Hwang | G06F 17/142 370/210 |

* cited by examiner

METHOD AND SYSTEM FOR MULTI-CARRIER TIME DIVISION MULTIPLEXING MODULATION/DEMODULATION

CROSS-REFERENCE TO RELATED APPLICATIONS

This present application is a U.S. national stage under 35 U.S.C. § 371 of International Application No. PCT/CN2015/075557, filed on Mar. 31, 2015, the contents of which are incorporated herein by reference in its entirety.

TECHNICAL FIELD

The present disclosure relates to multi-carrier modulation and demodulation technologies, and particularly to a multi-carrier time-division multiplexing (MC-TDMA) modulation/demodulation method and system.

BACKGROUND

The mobile communication technology has undergone development of four generations. The first-generation wireless communication belongs to analog communication, and only voice signals can be transmitted. From the second-generation wireless network, a mobile communication network comes into a digital network era, and voice and data can be transmitted simultaneously. With the development of a modulation technology, a data transfer rate is increased from 14.4 Kbps to 1 Gbps from the second-generation to fourth-generation mobile communication (Long Term Evolution (LTE)). The second-generation wireless communication adopts the Gaussian minimum shift keying (GMSK) modulation technology, the third-generation mobile communication adopts quadrature phase shift keying (QPSK), and both of the modulation technologies belong to the single-carrier modulation.

In order to increase the data transfer rate, the fourth-generation mobile communication network typified by the LTE standard adopts a multi-carrier modulation technology. In the LTE standard, the single-carrier frequency-division multiple access (SC-FDMA) technology may be adopted in the uplink, and the orthogonal frequency-division multiple access (OFDMA) technology may be adopted in the downlink. In the multi-carrier modulation, a high-speed signal may be divided into a plurality of low-speed signals through an IFFT, the low-speed signals may be modulated into different sub-carriers, and a signal having a long symbol period may be synthesized for transmission. Therefore, the multi-carrier modulation technology may have a capability of anti-multipath fading in a wireless channel.

A major impetus for the development of future mobile communication may be Internet of Things (IoT) and machine-to-machine (M2M) communication, and characteristics of the IoT and M2M communication may be random, asynchrony, short data, low latency, low power consumption and low cost. Therefore, there may be a need to study a new modulation technology to meet the requirements of the development of the future wireless communication, and thereby the present disclosure is provided.

SUMMARY

A multi-carrier time-division multiplexing modulation method, wherein the characteristics may lie in performing an interleaving allocation on an input symbol; performing a fast Fourier transform (FFT) using a fast Fourier transform; transforming a time domain symbol into a frequency domain symbol signal to perform a modified discrete Fourier transform (MDFT) treatment.

According to another embodiment of the present disclosure, the MDFT treatment in the multi-carrier time-division multiplexing modulation method may further include a sub-band analyzing and filtering treatment, an inverse Fourier transform treatment, and an interleaving operation treatment.

According to another embodiment of the present disclosure, the fast Fourier transform in the multi-carrier time-division multiplexing modulation method may be further an NM-point fast Fourier transform, N and M herein being positive integers that are larger than or equal to 1.

According to another embodiment of the present disclosure, the sub-band analyzing and filtering treatment included in the MDFT treatment in the multi-carrier time-division multiplexing modulation method may further include performing pre-filtering on an NM point frequency domain symbol signal, constructing a coefficient matrix H based on a prototype filter function, and right-multiplying the NM point frequency domain symbol signal by the coefficient matrix H to generate a 2NM point frequency domain symbol signal.

According to another embodiment of the present disclosure, the coefficient matrix used in the multi-carrier time-division multiplexing modulation method may be further generated based on performing an M/2 circular right-shift on a matrix with 4N×2N matrix element blocks.

According to another embodiment of the present disclosure, the coefficient matrix used in the multi-carrier time-division multiplexing modulation method may further include the following sub-matrices hi,0 and hi,1: dividing a coefficient h(n) (0<=n<=NM−1) of a root raised cosine (RRC) prototype function into N sub-blocks (each of the N sub-blocks includes M points), and constructing the diagonal matrix hi,0 and the diagonal matrix hi,1 based on the first M/2 points and the last M/2 points of the ith sub-block of the N sub-blocks respectively, i herein is an integer between 0 and N−1.

According to another embodiment of the present disclosure, an arrangement of the sub-matrix hi,0 and the sub-matrix hi,1 included in the coefficient matrix H used in the multi-carrier time-division multiplexing modulation method may be as follows:

$$H = \begin{bmatrix} h_{0,0} & 0 & h_{1,0} & 0 & h_{2,0} & \cdots & 0 & h_{N-1,0} & 0 \\ 0 & h_{0,1} & 0 & h_{1,1} & 0 & \cdots & h_{N-2,1} & 0 & h_{N-1,1} \\ 0 & h_{0,0} & 0 & h_{1,0} & 0 & \cdots & h_{N-2,0} & 0 & h_{N-1,0} \\ h_{N-1,1} & 0 & h_{0,1} & 0 & h_{1,1} & \cdots & 0 & h_{N-2,1} & 0 \\ \vdots & \vdots & \vdots & \vdots & \vdots & \vdots & \vdots & \vdots & \vdots \\ h_{1,0} & 0 & h_{2,0} & 0 & h_{3,0} & \cdots & 0 & h_{0,0} & 0 \\ 0 & h_{1,1} & 0 & h_{2,1} & 0 & \cdots & h_{N-1,1} & 0 & h_{0,1} \end{bmatrix}$$

According to another embodiment of the present disclosure, the inverse Fourier transform included in the MDFT treatment in the multi-carrier time-division multiplexing modulation method may be further an M-point inverse Fourier transform repeated 2N times.

The present disclosure also provides a multi-carrier time-division multiplexing demodulation method, and the method may include: removing prefixes of a received signal, equalizing the received signal without the prefixes by an equalizer, performing an inverse modified discrete Fourier transform (IMDFT) treatment to synthesize a full-band frequency domain signal, performing an inverse fast Fourier transform (IFFT) on the synthesized frequency domain signal to generate a time domain signal, performing symbol inverse ordering on the generated time domain signal, and obtaining a reconstructed input symbol signal of a sending end through a symbol inverse mapping treatment.

According to another embodiment of the present disclosure, the IMDFT treatment in the multi-carrier time-division multiplexing demodulation method may further include an inverse interleaving operation treatment, a Fourier transform treatment, and a sub-band synthesizing and filtering treatment.

According to another embodiment of the present disclosure, the inverse Fourier transform in the multi-carrier time-division multiplexing demodulation method may be further an NM-point inverse fast Fourier transform.

According to another embodiment of the present disclosure, the Fourier transform included in the IMDFT treatment in the multi-carrier time-division multiplexing demodulation method may be further an M-point Fourier transform repeated 2N times.

According to another embodiment of the present disclosure, the sub-band synthesizing and filtering treatment included in the IMDFT treatment in the multi-carrier time-division multiplexing demodulation method may further include performing post-filtering on a 2NM point frequency domain symbol signal, and right-multiplying the 2NM point frequency domain symbol signal by a transpose matrix of a coefficient matrix H to generate an NM point frequency domain symbol signal.

A multi-carrier time-division multiplexing modulation system may include: a symbol mapping unit, a symbol ordering unit, a unit configured to implement a fast Fourier transform, and an MDFT unit; the said MDFT unit may include a sub-band analyzing and filtering module, an inverse Fourier transform module, and an interleaving operation module.

According to another embodiment of the present disclosure, the Fourier transform implemented by the unit configured to implement the fast Fourier transform included in the multi-carrier time-division multiplexing modulation system may be further an NM-point fast Fourier transform, N and M being positive integers that are larger than or equal to 1.

According to another embodiment of the present disclosure, the sub-band analyzing and filtering module included in the MDFT unit in the multi-carrier time-division multiplexing modulation system may be further used to perform pre-filtering on an NM point frequency domain symbol signal, construct a coefficient matrix H based on a prototype filter function, and right-multiply the NM point frequency domain symbol signal by the coefficient matrix H to generate a 2NM point frequency domain symbol signal.

According to another embodiment of the present disclosure, the inverse Fourier transform implemented by the inverse Fourier transform module included in the MDFT unit in the multi-carrier time-division multiplexing modulation system may be further an M-point inverse Fourier transform repeated 2N times.

A multi-carrier time-division multiplexing demodulation system may include an IMDFT unit, a unit configured to implement an inverse fast Fourier transform, a symbol inverse ordering unit, a symbol inverse mapping unit; the said IMDFT unit may include an inverse interleaving operation module, a Fourier transform module, and a sub-band synthesizing and filtering module.

According to another embodiment of the present disclosure, the inverse fast Fourier transform implemented by the unit configured to implement the inverse fast Fourier transform included in the multi-carrier time-division multiplexing demodulation system may be further an NM-point inverse fast Fourier transform, N and M being positive integers that are larger than or equal to 1.

According to another embodiment of the present disclosure, the sub-band synthesizing and filtering module included in the IMDFT unit in the multi-carrier time-division multiplexing demodulation system may be further used to perform post-filtering on a 2NM point frequency domain symbol signal, and right-multiply the 2NM point frequency domain symbol signal by a transpose matrix of a coefficient matrix H to generate an NM point frequency domain symbol signal.

DETAILED DESCRIPTION OF EMBODIMENTS

Figure 1:
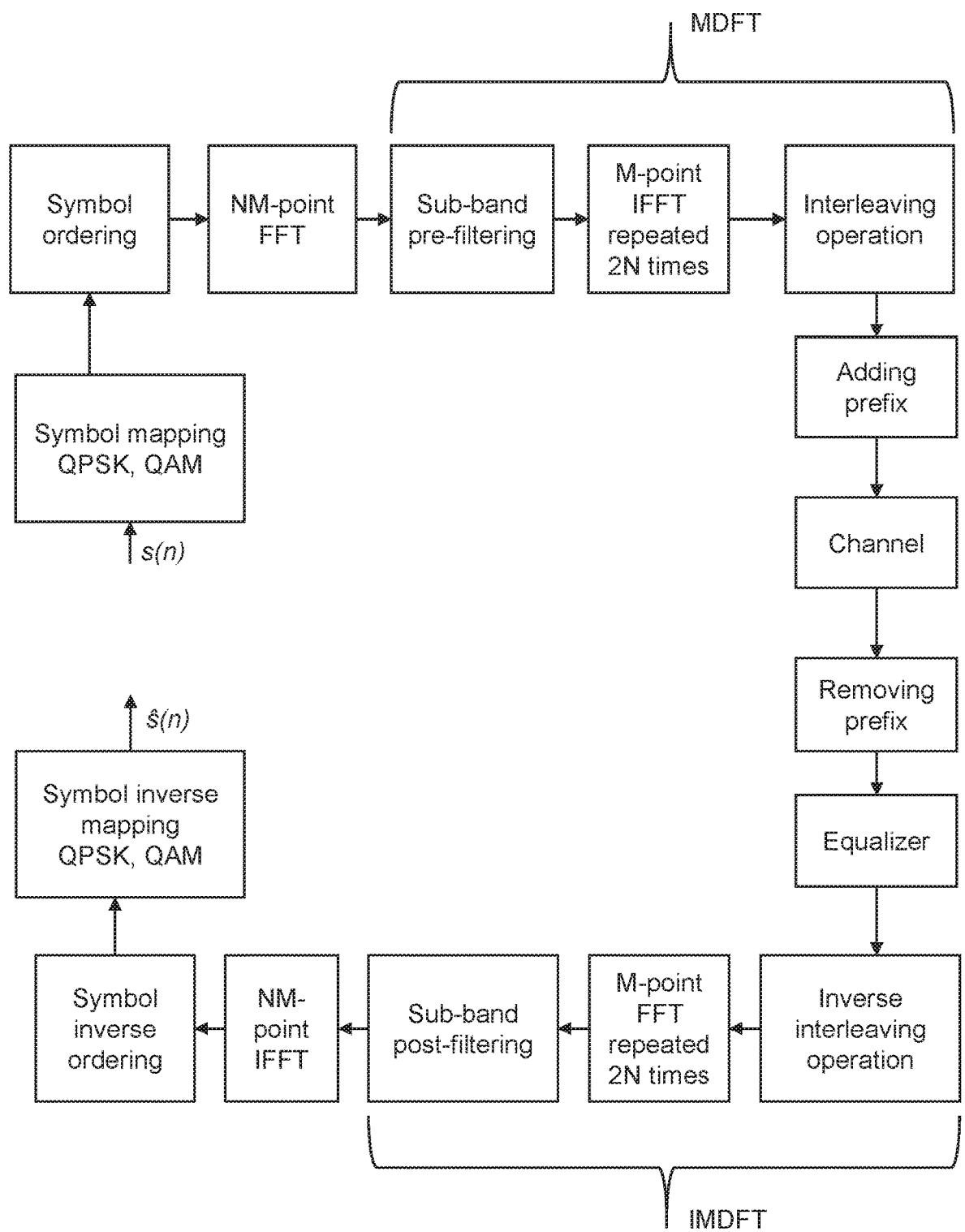
FIG. 1 is a structural block diagram illustrating a principle of a MC-TDMA modulation system.

As used in the disclosure and the appended claims, the singular forms "a," "an," and "the" include plural referents unless the content clearly dictates otherwise. In general, the terms "comprises," "comprising," "includes," and/or "including" when used in the disclosure, specify the presence of stated steps and elements, but do not preclude the presence or addition of one or more other steps or elements.

A multi-carrier modulation technology may be widely used in the fourth-generation mobile communication network typified by the LTE standard, and particularly, the orthogonal frequency division multiple access (OFDMA) technology may be adopted in the downlink. In the multi-carrier modulation, a high-speed signal may be divided into a plurality of low-speed signals through an inverse fast Fourier transform (IFFT), the low-speed signals may be modulated into different sub-carriers, and a signal having a long symbol period may be synthesized for transmission. Therefore, the multi-carrier modulation technology has a natural capability of anti-multipath fading in a wireless channel. Since the symbol period is expanded, the capacity of a signal to resist the multipath fading may be improved greatly, and thus the multi-carrier modulation technology may be an indispensable portion of high-speed wireless communication.

OFDMA and SC-FDMA may be sensitive to a carrier drift. In addition, a peak to average power ratio (PAPR) value of OFDMA may be relatively large. In contrast, a PAPR value of SC-FDMA may be relatively small. The LTE standard may be adopted in the present fourth-generation mobile communication network, for example, SC-FDMA is adopted in uplink communication. Since there is a need to remain multi-carrier characteristics of a SC-FDMA modulation signal, localized SC-FDMA (SC-LFDMA) may be adopted in the LTE standard. Although a PAPR value of SC-LFDMA is less than that of OFDMA, the PAPR value of SC-LFDMA may be still very different from a theoretical minimum value of PAPR, for example, it is possible to improve the PAPR of SC-LFDMA. Sub-carrier frequencies of a sending end and a receiving end may need to maintain strict synchronization in OFDMA and SC-FDMA, and thus there are extremely high requirements for crystal oscillator accuracies of the receiving end and the sending end.

The reason for the large PAPR value of the present multi-carrier modulation system may be that an inverse fast Fourier transform (IFFT) is used. Since a basis function of an IFFT is a complex exponential function, an amplitude value of the complex exponential function may be increased by multiplying and superimposing random symbols. Especially, when phases of the complex exponential are consistent after multiplying, the amplitude value may be maximum while the PAPR value is also maximum. There are many methods for reducing the PAPR value in the OFDMA system. However, these methods may only solve the problem of the high PAPR value, and cannot completely address the effect of sub-carrier drift of the OFDMA system on the system performance.

An alternative method for improving the anti-carrier drift capability of the multi-carrier modulation system is to replace the IFFT in the OFDMA system with a filter bank. A frequency characteristic of a filter bank prototype function may be better than that of a rectangular window function in the IFFT, and therefore inter-subcarrier interference (ICI) can be well cancelled. In addition, the good frequency characteristic of the prototype function may also increase the power spectral density of the system, reduce power leak between sub-bands, and improve the validity of signal transmission. However, a filter bank multi-carrier (FBMC) modulation system may have two features of high PAPR value and long delay since the good frequency characteristic requires a large prototype filter function coefficient. These features may restrict the application of the FBMC modulation system in practice.

An analysis may show that there are two basic methods to reduce the PAPR value, one is to reduce peak power of a modulation symbol, and the other is to shorten the length of the IFFT. Shortening the length of the IFFT while reducing frequency resolution of the modulation system may improve the anti-carrier drift capability of the system. Since the theoretical minimum PAPR value is a PAPR of an original input symbol signal, the PAPR value is lower when an output symbol is modulated as close as possible to the original input symbol. In the single carrier modulation, an FFT carrier mapping may be firstly performed on an input symbol, and then IFFT modulation may be performed. Based on the mode of a carrier mapping, a modulation symbol after FFT/IFFT may be the weighted sum (localized mapping) of the input symbol or repeat (interleaving mapping) of the input symbol. The PAPR value may directly influence the battery lifetime of a mobile terminal, and therefore, the lower PAPR value may be better for uplink communication.

At present, all modulation methods and systems (including systems which have been used in the standard) cannot solve the problems of the high PAPR in OFDMA and high carrier drift sensitivity at the same time. The present disclosure may combine the advantages of SC-FDMA and FBMC modulation technologies, and in a modulation system, successfully solve the above two problems which have plagued the wireless communication physics layer for many years. The MC-TDMA modulation system provided by the present disclosure can be used not only for high-speed communication but also for IoT and M2M communication.

A specific embodiment of the present disclosure may be a multi-carrier time-division multiplexing modulation and demodulation method, wherein before multi-carrier modulation is performed on an input symbol, an interleaving allocation and an FFT may be performed on the input symbol, a time domain symbol may be transformed into a frequency domain symbol signal, and an MDFT treatment may be performed on the frequency domain symbol signal. It should be noted that the description herein is merely a major process of a specific embodiment and should not be regarded as a unique embodiment, the various steps therein may be not necessary, and the whole process and specific steps thereof are not limited to the description of the drawings and the above description. For example, before an interleaving allocation is performed on an input symbol, some corresponding preprocessing steps may be carried out, and the order of an FFT and an MDFT treatment may be adjusted appropriately. It will be apparent to those skilled in the art that after understanding the contents and principles of the present disclosure, various modifications and variations can be made in the form and details of the system without departing from the principles and constructions of the present disclosure. However, these modifications and variations are still within the scope of the claims of the present disclosure.

In the portion of the MDFT treatment, the difference between the present disclosure and the conventional FBMC (OFDM/OQAM) modulation scheme and the classical MDFT treatment structure may be that a sending end adopts a synthesizing filter bank structure in the traditional FMBC, but in the present disclosure, a sending end adopts an analyzing filter bank structure, and an IFFT is performed instead of the conventional FFT after pre-filtering is performed on a signal. A pre-filter may be positioned between an NM-point FFT and an M-point IFFT, and in MC-TDMA, play a dual role of reducing the PAPR value of the system using the symmetry of a filter coefficient and allocating a frequency domain symbol signal to different sub-bands for multi-carrier modulation. The description herein is merely a major process of a specific embodiment and should not be regarded as a unique embodiment, the various steps therein may be not necessary, and the whole process and specific steps thereof are not limited to the description of the drawings and the above description.

A further specific embodiment of the present disclosure may provide a multi-carrier time division multiplexing system, and the system may include a sending end and a receiving end. The sending end may include: a symbol mapping unit for performing a symbol mapping on a binary bit sequence to obtain a complex symbol signal; a symbol ordering unit for performing an interleaving allocation on an input symbol; a fast Fourier transform (FFT) unit for transforming a time domain symbol signal into a frequency domain symbol signal; and an MDFT unit, which adopts an analyzing filter bank structure, for performing an IFFT after performing pre-filtering on the frequency domain symbol signal as a pre-filter. The receiving end may include: a prefix removal unit and an equalizer for respectively performing prefix removal and an equalization treatment on a received signal to obtain a symbol signal; an IMDFT unit for performing an inverse interleaving operation and performing an inverse MDFT on the signal obtained by the inverse interleaving operation; and an IFFT unit for performing an inverse fast Fourier transform (IFFT) on the obtained symbol signal to obtain a reconstructed signal of a sending end.

The description herein is merely a major process of a specific embodiment and should not be regarded as a unique embodiment, the various steps therein may be not necessary, and the whole process and specific steps thereof are not limited to the description of the drawings and the above description. For example, depending on the communication quality of a wireless channel, the equalizer herein may adopt a frequency domain zero forcing equalizer or a non-zero forcing equalizer, adopt a blind equalizer or a non-blind equalizer, or adopt an adaptive equalizer or a non-adaptive equalizer. Similarly, it will be apparent to those skilled in the art that after understanding the contents and principles of the present disclosure, various modifications and variations can be made in the form and details of the system without departing from the principles and constructions of the present disclosure. However, these modifications and variations are still within the scope of the claims of the present disclosure.

Further, a pre-filter of a sending end may be positioned between an NM point FFT and an M point IFFT, a coefficient of the filter may have the symmetry, and a frequency domain symbol signal may be allocated to different sub-bands for multi-carrier modulation.

In a system, in which the number of access users is N, the number of sub-carriers of each user is M, and thus the total number of sub-carriers L is equal to NM. The symbol mapping unit may perform a symbol mapping to obtain M time domain input symbol signals, the symbol ordering unit may allocate the M time domain input symbol signals to NM time points using an interleaving allocation mode, and the FFT unit may perform an FFT operation on an NM point time domain symbol signal to obtain an NM point frequency domain symbol signal.

Further, the MDFT unit may include: a sub-band analyzing and filtering portion, which is used to perform an FFT on an NM point input symbol signal of a sending end to obtain an NM point frequency domain symbol signal, construct a coefficient matrix H based on a prototype filter function, and right-multiply the NM point frequency domain symbol signal by the coefficient matrix H to obtain a 2NM point frequency domain symbol signal; an IFFT transform portion, which is used to perform an M-point IFFT repeated 2N times on the 2NM point frequency domain symbol signal to obtain a 2NM point time domain signal; and an interleaving operation portion, which is used to perform an interleaving operation on the 2NM point time domain signal to obtain an NM point output complex symbol signal. The interleaving operation portion may divide the 2NM point time domain complex signal into an upper path and a lower path. Signals in the upper path may be not delayed, and there may be one bit delay in signals in the lower path. After two times sampling is performed on the signals in the upper and lower paths, a real part and an imaginary part may be extracted alternately to synthesize a complex symbol signal, which makes the 2NM point complex signal become an NM point complex signal. The coefficient matrix H may be obtained by performing an M/2 circular right-shift on a coefficient of an MDFT analyzing filter bank. The coefficient of the MDFT analyzing filter bank may be constituted by a square root raised cosine (RRC) function, and the dimension of the matrix H may be 2NM×NM. The said constructing the coefficient matrix H may specifically include: obtaining a matrix H of 2NM×NM by performing an M/2 circular right-shift on a matrix with M×NM matrix element blocks, and shifting M/2 points shifted from the right to M/2 points at the left. The shift may begin from the first M×NM matrix block to the (2N−1)th matrix block.

Further, an equalizer of the receiving end may perform prefix removal on a symbol signal and then perform an FFT to obtain a frequency domain signal, divide the frequency domain signal by a system function of a channel, and obtain a signal with channel interference removed after an IFFT. An IMDFT unit of the receiving end may be used to reproduce the NM point symbol signal with the channel interfere removed to a 2NM point symbol signal, perform an M-point FFT repeated 2N times on the 2NM point symbol signal to obtain a 2NM point frequency domain signal, and right-multiply the 2NM point frequency domain signal by a transposed matrix H of the coefficient matrix H to obtain an NM point signal.

The MC-TDMA system provided by the present disclosure may be implemented by a simple structure, the sending end may be implemented by an input symbol interleaving allocation and an MDFT filter bank, and the receiving end may adopt an IMDFT synthesizing filter bank structure and an FFT unit. The interleaving operation may cancel interference between adjacent sub-bands, and a 2NM point symbol signal is transformed to an NM point symbol signal after the interleaving operation. The number of sub-carriers may be M, N multi-carrier modulation symbols may be respectively transmitted in N time periods, and the optimal time frequency resolution of the system may be obtained by adjusting N and M, so that the system has a capability of anti-multipath fading in a wireless channel and an anti-carrier drift capability, and the MC-TDMA system focus advantages of all other modulation systems. The sending end may adopt an analyzing filter bank structure. The receiving end may adopt a synthesizing filter bank structure and recover an NM point input signal of the sending end one time, so that the system has the advantages of short time delay, saving the resource occupied by the prefix, using the frequency domain zero forcing equalizer and easy implementation.

The implementation of the present disclosure will be described in further detail with reference to the drawings and specific examples. Obviously, drawings described below are only some embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

FIG. 1 a structural block diagram illustrating a principle of a MC-TDMA modulation system. The MC-TDMA modulation system may include a sending end and a receiving end. The sending end may include a symbol mapping unit, a symbol ordering unit, an NM-point FFT unit, a sub-band analyzing and filtering unit, an M-point IFFT repeated 2N times unit and an interleaving operation unit. The receiving end may include an inverse interleaving operation unit, an M-point FFT repeated 2N times unit, a sub-band synthesizing filter, an NM-point IFFT unit, a symbol inverse ordering unit and a symbol inverse mapping unit.

An input binary bit sequence s(n) may be subjected to a symbol mapping by the symbol mapping unit, a QPSK or QAM method may be used in the symbol mapping, and a complex symbol signal to be modulated may be obtained after the symbol mapping. The complex symbol signal may be subjected to a symbol ordering treatment by the symbol ordering unit, which adopts an interleaving ordering mode, for example, a symbol signal is inserted every N points, a value between two non-zero symbol signals is zero for a single user (uplink transmission), and a value between two non-zero symbol signals is a signal of other users. After treatment of the ordering unit, an NM point symbol signal may be obtained. The obtained ordering symbol signal may be processed by the NM-point FFT unit, after the sub-band analyzing and filtering unit performs analyzing and filtering on the signal, the signal may be transmitted to the M-point IFFT repeated 2N times unit for transform to obtain a signal after modulation, and the obtained signal may be transmitted to a channel after an interleaving operation and prefixing and then sent to the receiving end. The receiving end may remove prefixes of the received signal, and the equalizer may perform equalization processing on the signal without the prefixes. After the signal is transmitted to the inverse interleaving operation unit for processing, the M-point FFT unit may perform an M-point FFT repeated 2N times on the signal to obtain a frequency domain sub-band signal. Then, a full-band signal may be synthesized through sub-band synthesizing and filtering, the synthesized frequency domain signal may be transmitted to the NM-point IFFT unit to obtain a time domain signal. The signal output by the IFFT unit may be subjected to a symbol inverse ordering, and a reconstructed input symbol signal of the sending end may be obtained after processing of the symbol inverse mapping unit.

Specifically, for a multi-user access modulation system, it may be assumed that the total number of sub-carriers L is equal to NM, and the number of sub-carriers allocated to each user is M. M symbol signals may be obtained by mapping the sub-carrier signal via the symbol mapping unit, and allocated to L time points via the interleaving operation unit adopting an interleaving symbol allocation mode. An L point FFT may be performed on a complex symbol signal, and a time domain symbol signal may be transformed to frequency domain to obtain a frequency domain signal.

Figure 2:
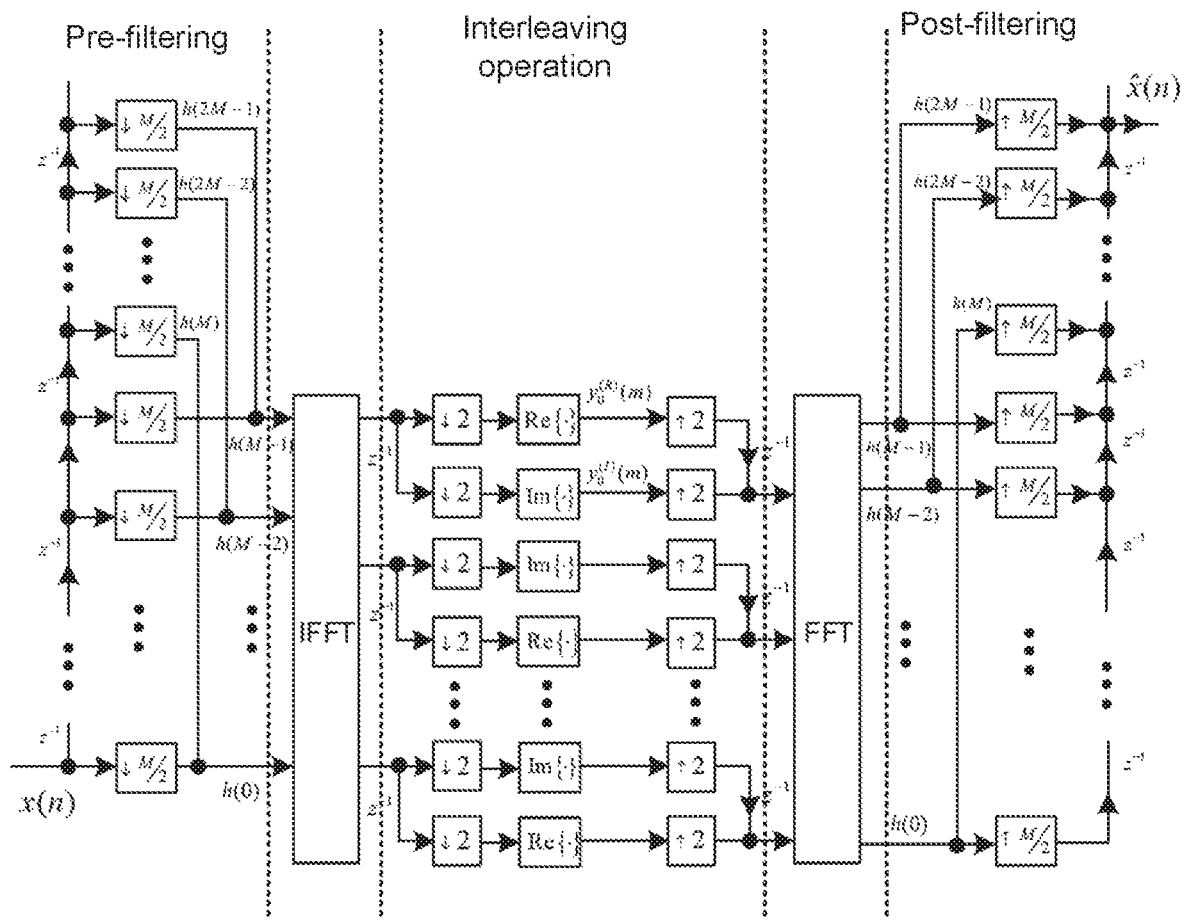
FIG. 2 is a block diagram illustrating a separation implementation of a frequency domain MDFT filter bank in MC-TDMA.

As shown in FIG. 2, an MDFT filter bank may be at the front of an FFT unit and composed of three portions. The first portion may be a pre-filtering unit, the second portion may be an IFFT unit, and the third portion may be a signal interleaving operation unit.

The MDFT filter bank may include: a sub-band analyzing and filtering portion, an IFFT portion, a signal interleaving operation portion. After the sub-band analyzing and filtering portion and the IFFT portion respectively completing pre-filtering and an IFFT, the signal interleaving operation portion may perform an interleaving operation on a 2NM point symbol signal and obtain an NM point complex symbol to output for transmission.

The pre-filtering unit may be composed of an analyzing filter bank with a decimation ratio of M/2 (the number of channels of the filter bank is M), and perform a sub-band analyzing treatment on an input signal x(n) to obtain M sub-band signals. A filter bank with a coefficient h(n) of a prototype function may be selected, and $z^{-1}$ in FIG. 2 may represent one bit delay. The NM point input symbol signal x(n) of each frame may enter the pre-filter along a delay line, subjected to M/2 sampling, obtain NM path output, and obtain M path output after superimposing the NM path output. Wherein N is determined by the number of users of the modulation system, and M is determined by the number of sub-carriers. After inverse fast Fourier transform (IFFT) is performed on the M path output, an M path modulation signal may be obtained. An interleaving operation may be performed on the modulation signal before being sent, thereby canceling interference between sub-bands. The interleaving operation may include the interleaving operation of the sending end and the inverse interleaving operation of the receiving end. The interleaving operation portion of the sending end may be composed of a decimator with a decimation value of two, real part and imaginary part operation units of a complex number. A signal may be divided into an upper path and a lower path after entering the interleaving operation portion, there may be no delay in the upper path and there may be one bit delay in the lower path. After two times sampling is performed on the signals in the upper and lower paths, the real part and imaginary part may be extracted alternately, and extracted real part and imaginary part values may synthesize a new complex symbol signal value for transmission. Real part and imaginary part operations of adjacent two channels may need interleaving, and if the real part operation is performed on an upper path of a previous channel, the imaginary part operation may need to be performed on an upper path of a current channel. In FIG. 2, $z^{-1}$ may represent one bit delay, $\downarrow M/2$ may represent M/2 sampling, $\uparrow M/2$ may represent M/2 interpolation, h(n) may represent a RRC prototype filter function, Re{ } and IM{ } may respectively represent the real part operation and the imaginary part operation, x(n) and $\hat{x}(n)$ may respectively represent an input signal of the sending end and a reconstructed signal of the receiving end.

Since the two times sampling and the interleaving operation, a 2NM point input may become an NM point output, thereby guaranteeing the conformity of the number of input symbols and the number of output in the MC-TDMA system. After the above processing, a cyclic prefix may be added on the synthesized complex symbol signal, and then the signal may enter a wireless channel to be sent.

The optimal MDFT filter bank may be obtained in the following manner. The pre-filtering portion may construct a coefficient matrix H based on a prototype filter function, and right-multiply an NM point frequency domain symbol signal by the coefficient matrix H to obtain a 2NM point frequency domain symbol signal. The IFFT portion may perform an M-point IFFT repeated 2N times on a 2NM point frequency domain symbol signal to obtain a 2NM point time domain signal. The interleaving operation portion may perform an interleaving operation on the 2NM point time domain signal to obtain an NM point complex symbol signal output.

Specifically, the method for constructing the coefficient matrix H based on the prototype filter function may be as follows. If the prototype filter is a square root raised cosine (RRC) function, the coefficient h(n) of the prototype filter function may be expressed as:

$$h(n) = \frac{\frac{4rn}{M}\cos\left[\frac{\pi(1+r)n}{M}\right] + \sin\left[\frac{\pi(1-r)n}{M}\right]}{\left[1 - \left(\frac{4rn}{M}\right)^2\right]\pi n}, -\infty \leq n < \infty$$

$$h(0) = \frac{1}{M} + \frac{r}{M}\left(\frac{4}{\pi} - 1\right)$$

$$h\left(\pm\frac{M}{4r}\right) = -\frac{r}{M}\left\{\frac{2}{\pi}\cos\left[\frac{\pi}{4r}(1+r)\right] - \cos\left[\frac{\pi}{4r}(1-r)\right]\right\}$$

wherein M is equal to the number of sub-carriers, r represents a roll-off factor of the RRC function and determines a stop band attenuation factor of a RRC function filter, and a range of a variant n of the RRC function is determined by the length NM of the pre-filter. The construction of the coefficient matrix H is not limited to the above method and the specific set parameters.

For constructing the coefficient matrix H, it may be assumed that the number of access users is N, the number of sub-carriers allocated to each user is M, and the matrix H may be obtained by performing an M/2 circular right-shift on a matrix with 4N×2N matrix element blocks, wherein the matrix element blocks hi,0 and hi,1 (0<=i<=N-1) may be two diagonal matrixes. If the coefficient h(n) of the RRC prototype function is divided into N sub-blocks (each sub-block includes M points), hi,0 and hi,1 may be respectively composed of the first M/2 points and the last M/2 points of the ith sub-block. The size of H may be 2NM×NM. In the process of circular shift, the M/2 points shifted from the right may be shifted to the left M/2 points. The shift may begin from the first M×NM matrix block to the (2N-1)th matrix block.

$$H = \begin{bmatrix} h_{0,0} & 0 & h_{1,0} & 0 & h_{2,0} & \ldots & 0 & h_{N-1,0} & 0 \\ 0 & h_{0,1} & 0 & h_{1,1} & 0 & \ldots & h_{N-2,1} & 0 & h_{N-1,1} \\ 0 & h_{0,0} & 0 & h_{1,0} & 0 & \ldots & h_{N-2,0} & 0 & h_{N-1,0} \\ h_{N-1,1} & 0 & h_{0,1} & 0 & h_{1,1} & \ldots & 0 & h_{N-2,1} & 0 \\ \vdots & \vdots & \vdots & \vdots & \vdots & \vdots & \vdots & \vdots & \vdots \\ h_{1,0} & 0 & h_{2,0} & 0 & h_{3,0} & \ldots & 0 & h_{0,0} & 0 \\ 0 & h_{1,1} & 0 & h_{2,1} & 0 & \ldots & h_{N-1,1} & 0 & h_{0,1} \end{bmatrix}$$

$$h_{i,0} = \begin{bmatrix} h(iM) & 0 & \ldots & 0 \\ 0 & h(iM+1) & \ldots & 0 \\ \vdots & \vdots & \ddots & \vdots \\ 0 & 0 & \ldots & h(iM+M/2-1) \end{bmatrix},$$

$$h_{i,1} = \begin{bmatrix} h(iM+M/2) & 0 & \ldots & 0 \\ 0 & h(iM+M/2+1) & \ldots & 0 \\ \vdots & \vdots & \ddots & \vdots \\ 0 & 0 & \ldots & h(iM+M-1) \end{bmatrix}$$

$$H = \begin{bmatrix} h_{0,0} & 0 & h_{1,0} & 0 \\ 0 & h_{0,1} & 0 & h_{1,1} \\ 0 & h_{0,0} & 0 & h_{1,0} \\ h_{1,1} & 0 & h_{0,1} & 0 \end{bmatrix}$$

The construction of the matrix H and hi,0 and hi,1 may be described in a specific example below. It may be assumed that the number of the users N is equal to 2, the number of the sub-carriers M is equal to 8 and the roll-off factor r is equal to 0.5, and the coefficient h(n) of the prototype function may be obtained based on the RRC formula:

$$h(n) = \frac{\frac{4*0.5*n}{8}\cos\left[\frac{\pi(1+0.5)n}{8}\right]+\sin\left[\frac{\pi(1-0.5)n}{8}\right]}{\left[1-\left(\frac{4*0.5*n}{8}\right)^2\right]\pi n},$$

$$-4 \leq n < 4, n \neq 0, -4$$

$$h(0) = \frac{1}{8} + \frac{0.5}{8}\left(\frac{4}{\pi}-1\right)$$

$$h(-4) = -\frac{0.5}{8}\left\{\frac{2}{\pi}\cos\left[\frac{\pi}{4*0.5}(1+0.5)\right]-\cos\left[\frac{\pi}{4*0.5}(1-0.5)\right]\right\}$$

The matrix element blocks $h_{0,0}$, $h_{0,1}$, $h_{1,0}$, $h_{1,1}$ may be respectively:

$$h_{0,0} = \begin{bmatrix} h(0) & & & \\ & h(1) & & \\ & & h(2) & \\ & & & h(3) \end{bmatrix}$$

$$h_{0,1} = \begin{bmatrix} h(4) & & & \\ & h(5) & & \\ & & h(6) & \\ & & & h(7) \end{bmatrix}$$

$$h_{1,0} = \begin{bmatrix} h(8) & & & \\ & h(9) & & \\ & & h(10) & \\ & & & h(11) \end{bmatrix}$$

$$h_{1,1} = \begin{bmatrix} h(12) & & & \\ & h(13) & & \\ & & h(14) & \\ & & & h(15) \end{bmatrix}$$

Finally, the obtained matrix H may be equal to $$H = \begin{bmatrix} h_{0,0} & 0 & h_{1,0} & 0 \\ 0 & h_{0,1} & 0 & h_{1,1} \\ 0 & h_{0,0} & 0 & h_{1,0} \\ h_{1,1} & 0 & h_{0,1} & 0 \end{bmatrix}$$

A 2NM point symbol signal may be obtained by right-multiplying an NM point frequency domain signal X(k) by the coefficient matrix H, an M-point inverse fast Fourier transform (IFFT) repeated two times operation may be performed on the 2NM point symbol signal, and a 2NM point time domain signal may be obtained.

The receiving end may perform an inverse operation of the sending end. The receiving end may perform prefix removal processing on a received signal, and then an equalizer may perform an equalization operation to remove channel interference. After the signal is transmitted to an inverse interleaving operation unit for processing, an M-point FFT unit may perform an M-point FFT repeated 2N times on the signal to obtain a frequency domain sub-band signal. Then, a full-band signal may be synthesized via sub-band synthesizing and filtering, and transmitted to an NM-point IFFT unit to obtain a time domain signal. Symbol inverse ordering may be performed on the signal output by the transform unit, and then a reconstructed symbol signal of the sending end may be obtained through processing of a symbol inverse mapping unit.

The present disclosure may adopt a frequency domain zero forcing equalizer. The frequency domain zero forcing equalizer may perform an FFT to transform the signal after prefix removal to frequency domain, and divide the signal by a system function H(k) (Fourier transform of channel impulse response h(n)), and finally perform an inverse fast Fourier transform (IFFT) to obtain the signal with the channel interference removed.

MC-TDMA may be a multi-carrier modulation system based on a filter bank, and use a modified DFT (MDFT) filter bank. MC-TDMA may be obtained by introducing advantages of the single carrier modulation system based on the conventional filter bank multi-carrier (FBMC) modulation system. The MC-TDMA system may have double advantages of the multi-carrier and single carrier systems, and have the extremely low power peak to average power ratio (PAPR) and the strong anti-multipath fading capability in a wireless channel and an anti-carrier asynchrony capability. The PAPR value may approach a theoretical minimum value, and may be lower than the PAPR value of the single carrier frequency division multiplexing access (SC-FDMA) system used in the LTE standard. The simulation may show that the anti-carrier asynchrony capability of the MC-TDMA system is 10-fold or more of OFDM. The MC-TDMA modulation system may be used for both uplink communication and downlink communication. The MC-TDMA system may reduce power consumption of a terminal device and a base station device, and simultaneity reduce a precision requirement for the terminal device clock frequency. The MC-TDMA system may have the features of the flexible design and easy implementation, and may be used for both high-speed communication and Internet of things communication.

Figure 3:
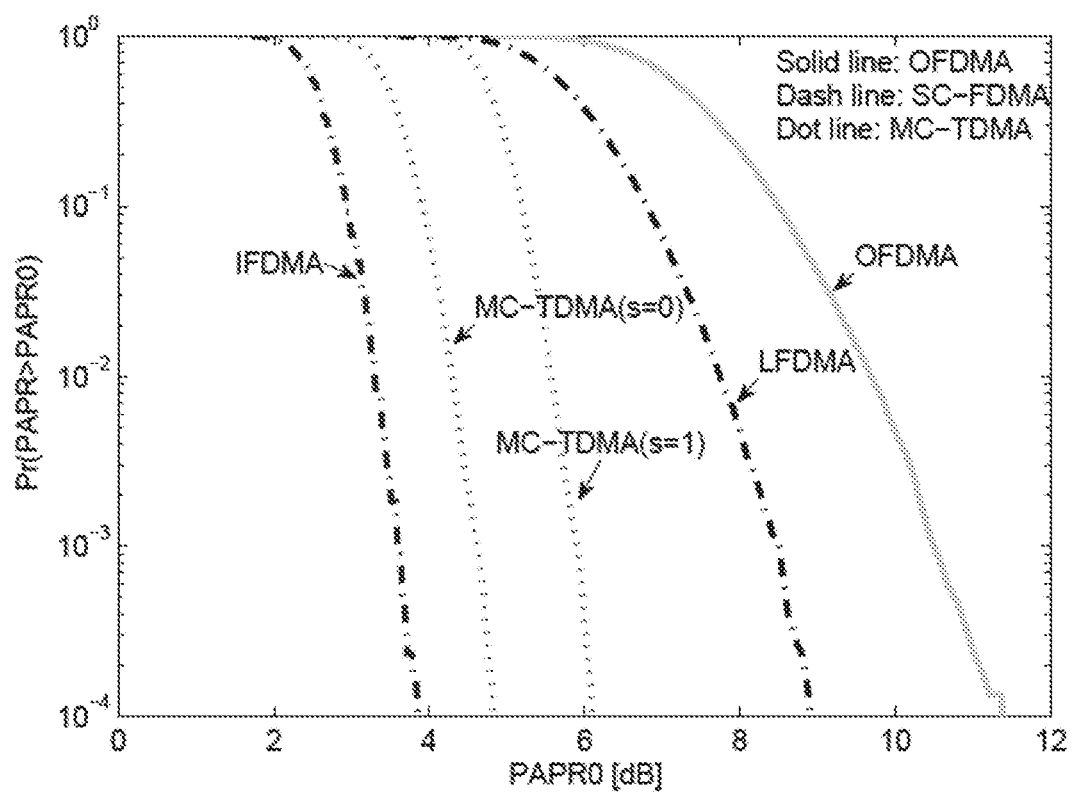
FIG. 3 is a schematic diagram of a PAPR simulation result.
Figure 4:
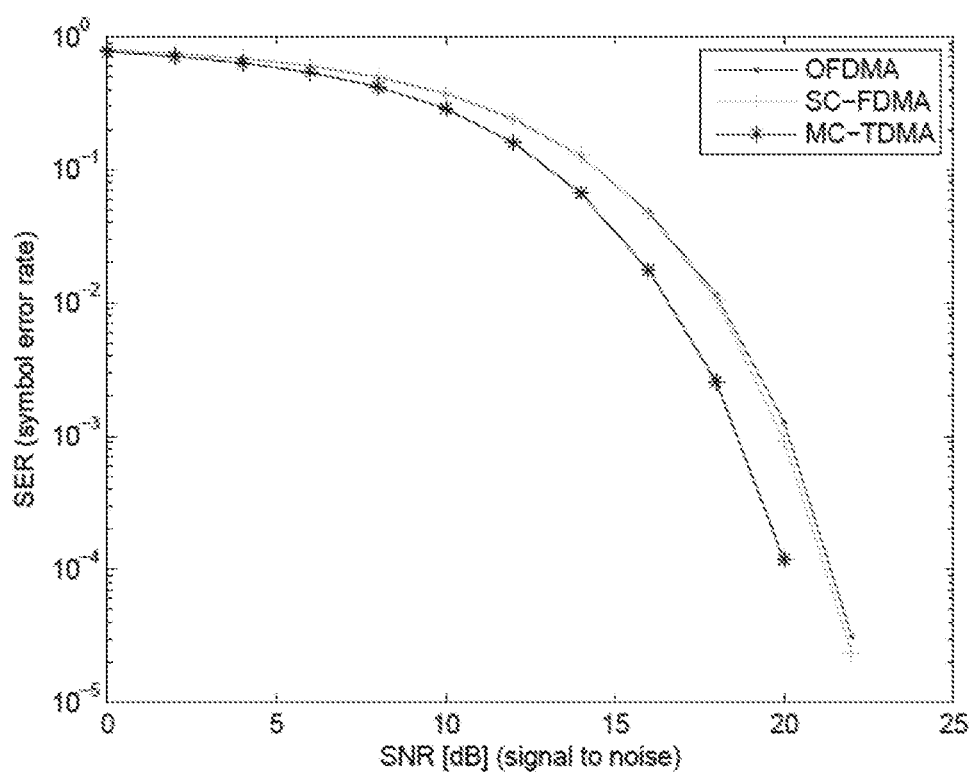
FIG. 4 illustrates a simulation result of a symbol error rate of a MC-TDMA system.
Figure 5:
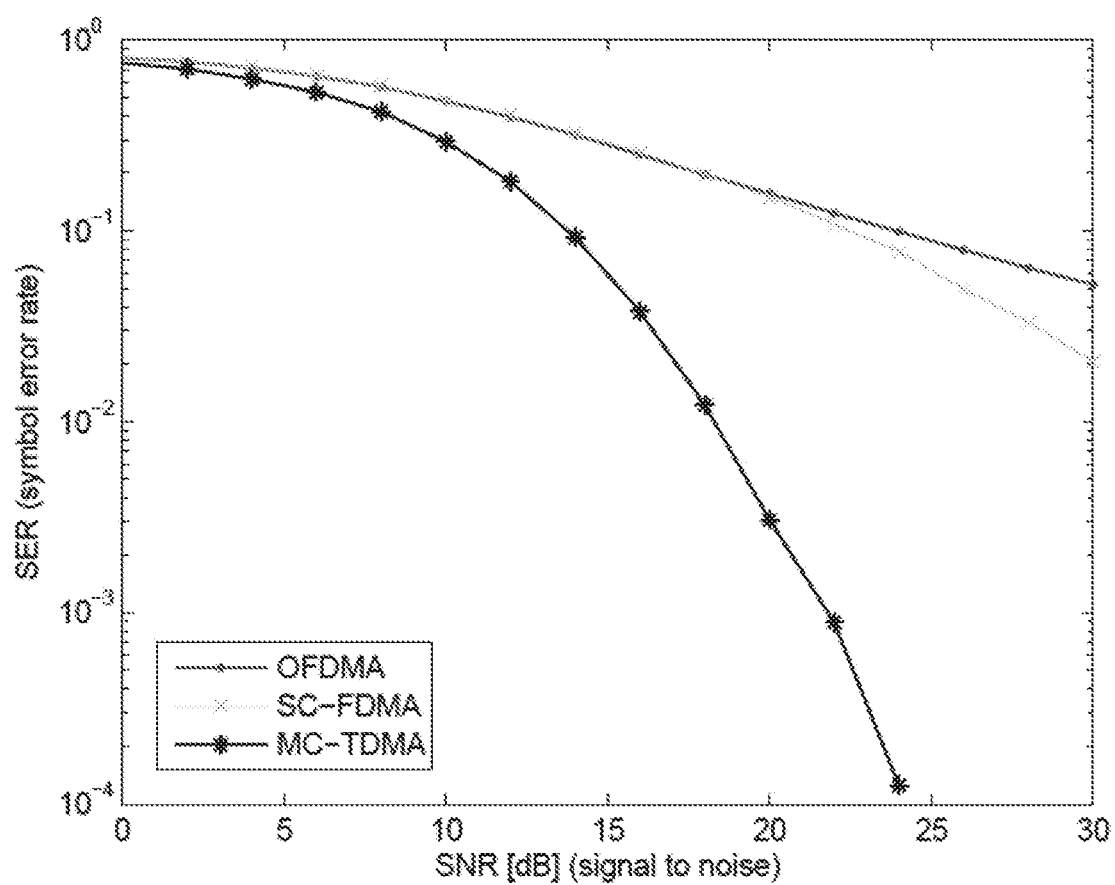
FIG. 5 illustrates a simulation result of an anti-carrier drift of a MC-TDMA system.

FIG. 3, FIG. 4 and FIG. 5 respectively show simulation results of performance comparison of the MC-TDMA modulation system provided by the present disclosure. FIG. 3 shows a simulation result of PAPR, in which s represents symbol shift, a solid line represents the OFDMA system, a broken line represents the SC-FDMA system, and a dotted line represents the MC-TDMA system. As best seen in FIG. 3, the PAPR value of the MC-TDMA system is the lowest, and has a very significant improvement compared to OFDMA and SC-FDMA. FIG. 4 shows a comparison diagram of a symbol error rate, and it can be seen from the figure that the error rate of MC-TDMA is lowest. FIG. 5 shows a comparison diagram of the performance of the anti-sub-carrier drift in the systems, and it can be seen from the figure that in the case of carrier drift is 10%, MC-TDMA still has excellent performance while OFDMA and SC-FDMA already cannot work. It can be clearly seen from the simulation results that the performance of the MC-TDMA system provided by the present disclosure is better than that of OFDMA and SC-FDMA. MC-TDMA can be used for both uplink communication and downlink communication, and for both high-speed communication and asynchronous low-speed communication.

The embodiments recited in the present disclosure are as described above, but are merely illustrative of the present disclosure for the purpose of understanding the present disclosure and are not intended to limit the present disclosure. It may be apparent to those skilled in the art that various changes and modifications may be made in the form and details of the disclosure in accordance with the present disclosure without departing from the spirit and essence of the present disclosure, but the scope of patent protection of the present disclosure is subject to the protection scope of the claims.

The invention claimed is:

1. A multi-carrier time-division multiplexing modulation method, wherein the characteristics lie in:
   performing an interleaving allocation on an input symbol;
   performing a fast Fourier transform (FFT) using a fast Fourier transform; and
   transforming a time domain symbol into a frequency domain symbol signal to perform a modified discrete Fourier transform (MDFT) treatment, wherein the characteristics lie in that the said MDFT treatment comprises: a sub-band analyzing and filtering treatment, an inverse Fourier transform treatment, and an interleaving operation treatment.

2. The modulation method according to claim 1, wherein the characteristics lie in that the said fast Fourier transform comprises: the Fourier transform implemented being an NM-point fast Fourier transform, N and M being positive integers that are larger than or equal to 1.

3. The modulation method according to claim 1, wherein the characteristics lie in that the said sub-band analyzing and filtering treatment further comprises:
   performing pre-filtering on an NM point frequency domain symbol signal,
   constructing a coefficient matrix H based on a prototype filter function, and
   right-multiplying the NM point frequency domain symbol signal by the coefficient matrix H to generate a 2NM point frequency domain symbol signal.

4. The modulation method according to claim 3, wherein the characteristics lie in that the said coefficient matrix H is generated based on performing an M/2 circular right-shift on a matrix with 4N×2N matrix element blocks.

5. The modulation method according to claim 4, wherein the characteristics lie in that the said coefficient matrix H includes the following sub-matrices hi,0 and hi,1:
   dividing a coefficient h(n) (0<=n<=NM−1) of a root raised cosine (RRC) prototype function into N sub-blocks, each of the N sub-blocks including M points, and
   constructing the diagonal matrix hi,0 and the diagonal matrix hi,1 based on the first M/2 points and the last M/2 points of the ith sub-block of the N sub-blocks respectively, wherein i is an integer between 0 and N−1.

6. The modulation method according to claim 5, wherein the characteristics lie in that an arrangement of the sub-matrix hi,0 and the sub-matrix hi,1 included in the said coefficient matrix H is as follows:

$$H = \begin{bmatrix} h_{0,0} & 0 & h_{1,0} & 0 & h_{2,0} & \cdots & 0 & h_{N-1,0} & 0 \\ 0 & h_{0,1} & 0 & h_{1,1} & 0 & \cdots & h_{N-2,1} & 0 & h_{N-1,1} \\ 0 & h_{0,0} & 0 & h_{1,0} & 0 & \cdots & h_{N-2,0} & 0 & h_{N-1,0} \\ h_{N-1,1} & 0 & h_{0,1} & 0 & h_{1,1} & \cdots & 0 & h_{N-2,1} & 0 \\ \vdots & \vdots & \vdots & \vdots & \vdots & \vdots & \vdots & \vdots & \vdots \\ h_{1,0} & 0 & h_{2,0} & 0 & h_{3,0} & \cdots & 0 & h_{0,0} & 0 \\ 0 & h_{1,1} & 0 & h_{2,1} & 0 & \cdots & h_{N-1,1} & 0 & h_{0,1} \end{bmatrix}.$$

7. The modulation method according to claim 1, wherein the characteristics lie in that the said inverse Fourier transform treatment comprises: the inverse Fourier transform implemented being an M-point inverse Fourier transform repeated 2N times.

8. A multi-carrier time-division multiplexing demodulation method, wherein the characteristics lie in:
   removing prefixes of a received signal,
   equalizing the received signal without the prefixes by an equalizer,
   performing an inverse modified discrete Fourier transform (IMDFT) treatment to synthesize a full-band frequency domain signal,
   performing an inverse fast Fourier transform (IFFT) on the synthesized frequency domain signal to generate a time domain signal,
   performing symbol inverse ordering on the generated time domain signal, and
   obtaining a reconstructed input symbol signal of a sending end through a symbol inverse mapping treatment, wherein the characteristics lie in that the IMDFT treatment comprises: an inverse interleaving operation treatment, a Fourier transform treatment, and a sub-band synthesizing and filtering treatment.

9. The demodulation method according to claim 8, wherein the characteristics lie in that the inverse Fourier transform implemented by the said inverse fast Fourier transform is an NM-point inverse fast Fourier transform.

10. The demodulation method according to claim 8, wherein the characteristics lie in that the Fourier transform implemented by the said Fourier transform is an M-point Fourier transform repeated 2N times.

11. The demodulation method according to claim 8, wherein the characteristics lie in that the said sub-band synthesizing and filtering treatment comprises:
   performing post-filtering on a 2NM point frequency domain symbol signal, and
   right-multiplying the 2NM point frequency domain symbol signal by a transpose matrix of a coefficient matrix H to generate an NM point frequency domain symbol signal.

12. A multi-carrier time-division multiplexing modulation system, wherein the characteristics lie in that the modulation system comprises:
   a symbol mapping unit,
   a symbol ordering unit,
   a unit configured to implement a fast Fourier transform, and
   an MDFT unit, wherein the said MDFT unit comprises:
      a sub-band analyzing and filtering module,
      an inverse Fourier transform module, and
      an interleaving operation module.

13. The modulation system according to claim 12, wherein the characteristics lie in that the Fourier transform implemented by the unit configured to implement the fast Fourier transform is an NM-point fast Fourier transform, N and M being positive integers that are larger than or equal to 1.

14. The modulation system according to claim 12, wherein the characteristics lie in that the said sub-band analyzing and filtering module is configured to:
   perform pre-filtering on an NM point frequency domain symbol signal,
   construct a coefficient matrix H based on a prototype filter function, and
   right-multiply the NM point frequency domain symbol signal by the coefficient matrix H to generate a 2NM point frequency domain symbol signal.

15. The modulation system according to claim 12, wherein the characteristics lie in that the inverse Fourier transform implemented by the inverse Fourier transform module is an M-point inverse Fourier transform repeated 2N times.

* * * * *